(12) United States Patent
Erdmann et al.

(10) Patent No.: US 12,234,134 B2
(45) Date of Patent: Feb. 25, 2025

(54) NET LOADING HANGER WITH FUNCTIONAL HOOKS

(71) Applicant: DEERE & COMPANY, Moline, IL (US)

(72) Inventors: Jeremy M. Erdmann, Floris, IA (US); Steven R. Pilcher, Keosauqua, IA (US)

(73) Assignee: DEERE & COMPANY, Moline, IL (US)

( * ) Notice: Subject to any disclaimer, the term of this patent is extended or adjusted under 35 U.S.C. 154(b) by 257 days.

(21) Appl. No.: 18/048,872

(22) Filed: Oct. 24, 2022

(65) Prior Publication Data

US 2023/0234818 A1 Jul. 27, 2023

Related U.S. Application Data

(60) Provisional application No. 63/267,222, filed on Jan. 27, 2022.

(51) Int. Cl.
*B66D 3/20* (2006.01)
*A01F 15/08* (2006.01)
*B66D 3/26* (2006.01)

(52) U.S. Cl.
CPC .............. *B66D 3/26* (2013.01); *A01F 15/08* (2013.01); *B66D 3/20* (2013.01)

(58) Field of Classification Search
CPC .... B66D 1/16; B66D 3/26; B66D 3/20; A01F 15/08; A01F 15/0715; A01F 15/071
See application file for complete search history.

(56) References Cited

U.S. PATENT DOCUMENTS

| 2008/0121119 | A1  | 5/2008 | Routledge |
| 2019/0166769 | A1* | 6/2019 | Little ................. A01F 15/0715 |
| 2020/0015426 | A1  | 1/2020 | Anaparti et al. |

FOREIGN PATENT DOCUMENTS

EP 3593625 A1 1/2020

OTHER PUBLICATIONS

Extended European Search Report and Written Opinion issued in European Patent Application No. 23152072.7, dated Oct. 27, 2023, in 13 pages.

* cited by examiner

*Primary Examiner* — Emmanuel M Marcelo

(57) ABSTRACT

A lift system for a baler implement includes a hanger including a hanger body defining a first aperture and a second aperture. The first aperture is positioned such that a center of gravity of the hanger body is located within the first aperture. The second aperture is positioned vertically below the first aperture. A lift line includes an upper end portion secured to a line actuator, and a lower end portion supporting the hanger. The lower end portion of the lift line is routed through the first aperture and the second aperture and is secured relative to the hanger such that the lift line applies a lift force to the hanger body at the center of gravity of the hanger body. The hanger includes a first pocket and a second pocket at respective ends of the hanger body shaped to capture respective lifting bands on a roll of wrap material.

24 Claims, 5 Drawing Sheets

NET LOADING HANGER WITH FUNCTIONAL HOOKS

CROSS-REFERENCE TO RELATED APPLICATIONS

This application claims the benefit of U.S. Provisional Patent Application Ser. No. 63/267,222, filed on Jan. 27, 2022, the disclosure of which is hereby incorporated by reference.

TECHNICAL FIELD

The disclosure generally relates to a lift system and a hanger for a baler implement.

BACKGROUND

A baler implement gathers crop material and forms the crop material into a baler. The baler implement may be configured as a round baler, which forms the bale into a bale having a cylindrical shape. The baler implement may include a wrap system that is operable to wrap or encircle the bale with a wrap material. The wrap material generally may be supplied on a roll, which is loaded into the wrap system.

The baler implement may include a roll lift system for lifting the roll of the wrap material into the wrap system. The lift system may include a hanger attached to a lift line, with the lift line attached to a line actuator for raising and lowering the hanger. When not in use, the hanger must be stored. Due to the height of the wrap system, the hanger may be positioned at a height above ground that is difficult for some users to reach, thereby making it difficult for these users to attach and/or detach the hanger.

SUMMARY

A lift system for loading a roll of wrap material into a wrap system of a baler implement is provided. The lift system includes a line actuator that is configured for attachment to a structure of the baler implement. A hanger includes a hanger body having a first planar side and an opposing second planar side. The hanger body defines a first aperture extending through the hanger body, between the first planar side and the second planar side. The first aperture is positioned such that a center of gravity of the hanger body is located within the first aperture. A lift line includes an upper end portion that is secured to the line actuator. The lift line is retractable into the line actuator in response to movement of the line actuator in a first direction. The lift line is extendable out of the line actuator in response to movement of the line actuator in a second direction. The lift line includes a lower end portion supporting the hanger. The lower end portion of the lift line passes through the first aperture such that the lift line applies a lift force to the hanger body at the center of gravity of the hanger body.

The line actuator may raise the hanger to a storage position in which the lift line is fully retracted and the hanger is brought into engagement with structure of the baler implement. Because the lift line applies the lift force at the center of gravity of the hanger body, the hanger will naturally come to rest against the structure with one of the first planar side or the second planar side of the hanger body flat against the structure, thereby securing the hanger tightly against the structure for storage. Tension of the lift line maintains the hanger in storage position. Because the hanger rests flat against the structure, and is tensioned against the structure by the lift line, the hanger may remain stationary in the storage position. As such, the lift system described herein provides for storage of the hanger without the user having to reattach the hanger from the lift line and/or detach the hanger from the lift line before or after use.

In one aspect of the disclosure, the lift line includes a central portion disposed between the upper end portion and the lower end portion of the lift line. A connection secures the lower end portion to the central portion thereby forming a loop portion of the lift line, which supports the hanger. In one aspect of the disclosure, the loop portion of the lift line passes through the first aperture.

In one aspect of the disclosure, the connection may include one of a sewn connection or a mechanical fastener. In one implementation, the connection includes a tri-glide fastener. However, it should be appreciated that the connection may include other types of mechanical fasteners not mentioned or described herein.

In one aspect of the disclosure, the hanger body defines a second aperture extending through the hanger body, between the first planar side and the second planar side. The hanger body includes an upper edge and an opposing lower edge. The second aperture is positioned vertically below the center of gravity when the hanger body is arranged in an upright position. The upright position is defined as an orientation of the hanger body in which the first planar side and the second planar side are vertical, with the upper edge of the hanger body disposed above the lower edge of the hanger body. As such, the second aperture is positioned vertically below the first aperture when the hanger body is arranged with the first planar side and the second planar side vertical and with the upper edge vertically above the lower edge.

In one aspect of the disclosure, the lift line follows a lashing path to secure the hanger to the lift line. In one implementation, following in sequence from the central portion of the lift line toward the lower end portion of the lift line, the lashing path passes the lift line from the first planar side to the second planar side through the first aperture, positions the lift line adjacent the second planar side between the first aperture and the second aperture, passes the lift line from the second planar side to the first planar side through the second aperture, positions the lift line adjacent the first planar side between the second aperture and the lower edge of the hanger body, wraps the lift line from the first planar side around the lower edge of the hanger body to the second planar side, positions the lift line on the second planar side of the hanger body between the lower edge of the hanger body and the first aperture, and passes the lift line from the second planar side to the first planar side through the first aperture, whereby the connection may secure the lower end portion of the lift line to the central portion of the lift line.

In one aspect of the disclosure, the hanger body may define a third aperture extending through the hanger body, between the first planar side and the second planar side. The third aperture is positioned vertically above the center of gravity when the hanger body is arranged in the upright position. The third aperture may be used for an alternative lashing path of the lift line if desired.

In one aspect of the disclosure, the lift line may include one of, but is not limited to, a generally circular cross-sectional shape or a generally flat cross sectional shape. For example, in one implementation, the lift line may include a substantially flat strap of nylon webbing material.

In one aspect of the disclosure, the first aperture may include a shape corresponding to a cross-sectional shape of the lift line. For example, in one implementation, if the lift line includes a substantially flat or rectangular cross-sectional shape, then the first aperture may include an elongated slot having a long axis extending parallel with a long dimension of the hanger, and shaped to correspond to the generally rectangular cross-sectional shape of the lift line. Similarly, the second aperture may include a shape corresponding to the cross-sectional shape of the lift line and substantially identical to the shape of the first aperture.

In one aspect of the disclosure, the hanger body includes an upper edge and an opposing lower edge each extending between a first longitudinal end and a second longitudinal end of the hanger body. The upper edge of the hanger body defines a first pocket disposed proximate the first longitudinal end of the hanger body. The upper edge of the hanger body defines a second pocket disposed proximate the second longitudinal end of the hanger body. In one aspect of the disclosure, each of the first pocket and the second pocket may be shaped to receive a respective lifting band of the roll of wrap material therein.

In one aspect of the disclosure, the first pocket may be shaped to include sides extending vertically when the hanger is arranged in the upright position to capture a respective lifting band of the roll of wrap material therebetween, such that the lifting band is restricted against lateral movement off the first longitudinal end of the hanger. Similarly, the second pocket may be shaped to include sides extending vertically when the hanger is arranged in the upright position to capture a respective lifting band of the roll of wrap material therebetween, such that the lifting band is restricted against lateral movement off the second longitudinal end of the hanger.

In one aspect of the disclosure, each of the first pocket and the second pocket may include an opening defining an opening width along the upper edge of the hanger. Each of the first pocket and the second pocket may include an interior for securing the respective lifting band therein, wherein the interior of each of the first pocket and the second pocket defines an interior width along the upper edge of the hanger. In one implementation the opening width is less than the interior width.

In one aspect of the disclosure, the first pocket may include a respective outer lip partially covering an outer edge of the first pocket, and a respective inner lip partially covering an inner edge of the first pocket. Similarly, the second pocket may include a respective outer lip partially covering an outer edge of the second pocket, and a respective inner lip partially covering an inner edge of the second pocket.

In one aspect of the disclosure, the first pocket and the second pocket are spaced equidistant from the center of gravity of the hanger body along a long dimension and/or a central longitudinal axis of the hanger body.

In one aspect of the disclosure, the first pocket and the second pocket each include a respective engagement surface positioned vertically below the first aperture, i.e., vertically below the center of gravity when the hanger is level, when the hanger body is arranged in the upright position with the upper edge positioned vertically above the lower edge.

The above features and advantages and other features and advantages of the present teachings are readily apparent from the following detailed description of the best modes for carrying out the teachings when taken in connection with the accompanying drawings.

DETAILED DESCRIPTION

Figure 1:
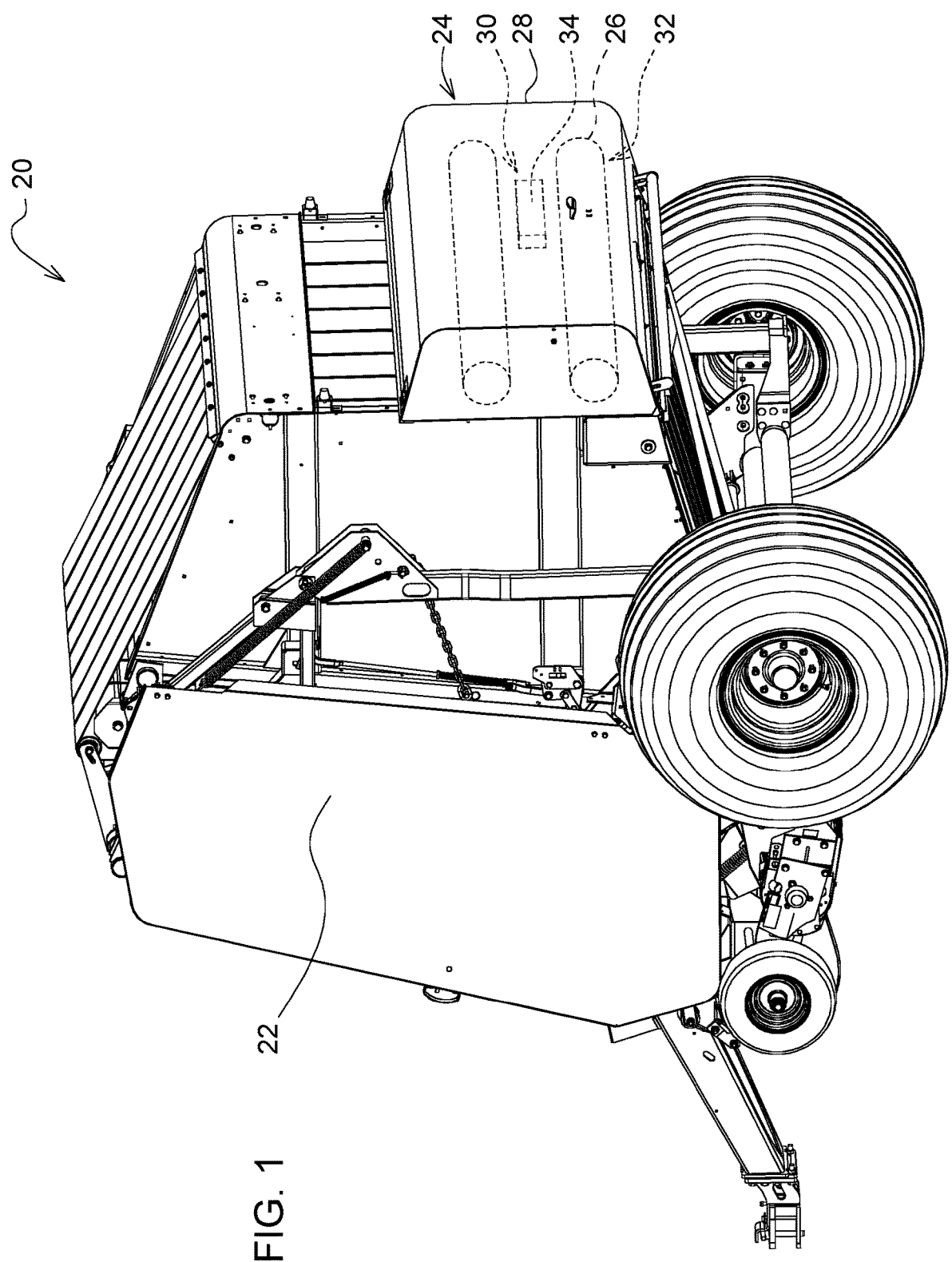
FIG. 1 is a schematic perspective view of a baler implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a baler implement is generally shown at 20. In the example implementation shown in the figures and described herein, the baler implement 20 is configured to produce a bale having a cylindrical shape, and may be referred to as a round baler. However, it should be appreciated that the baler implement 20 may be configured differently than described herein, and that the teachings of the disclosure may apply to implements other than the round baler described herein.

The baler implement 20 accumulates cut crop material, and forms the accumulated crop material into a bale. In the example implementation described herein, the bale has a cylindrical shape, and may be referred to as a round bale.

Generally, the baler implement 20 accumulates the crop material in a bale forming chamber, wherein the baler implement 20 forms the crop material into the round bale. The manner, process, and/or features used to form the crop material into the round bale in the bale forming chamber are known to those skilled in the art, are not pertinent to the teachings of this disclosure, and are therefore not described in detail herein.

Figure 2:
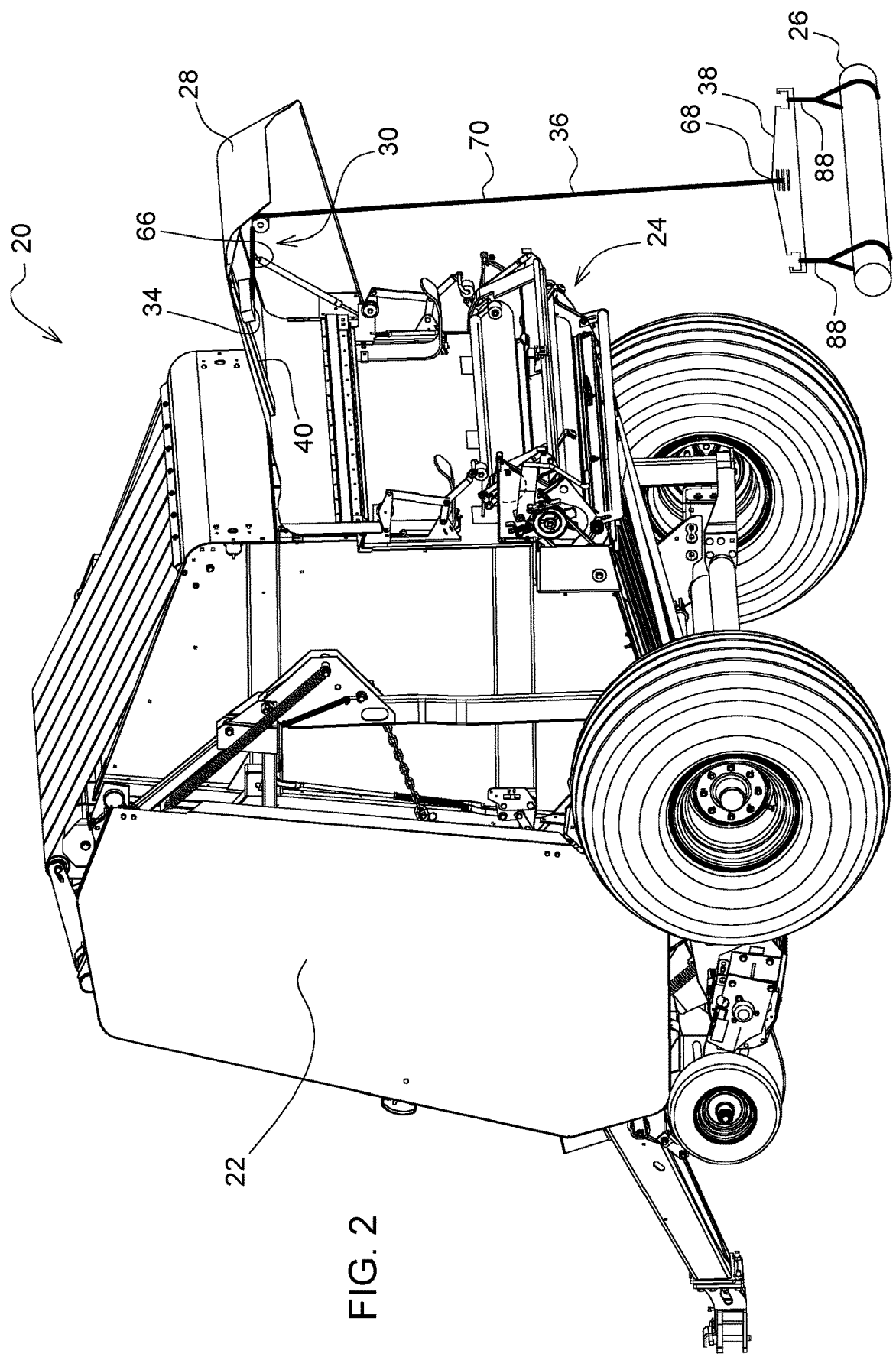
FIG. 2 is a schematic side view of the baler implement showing a lift system raising a roll of wrap material.
Figure 3:
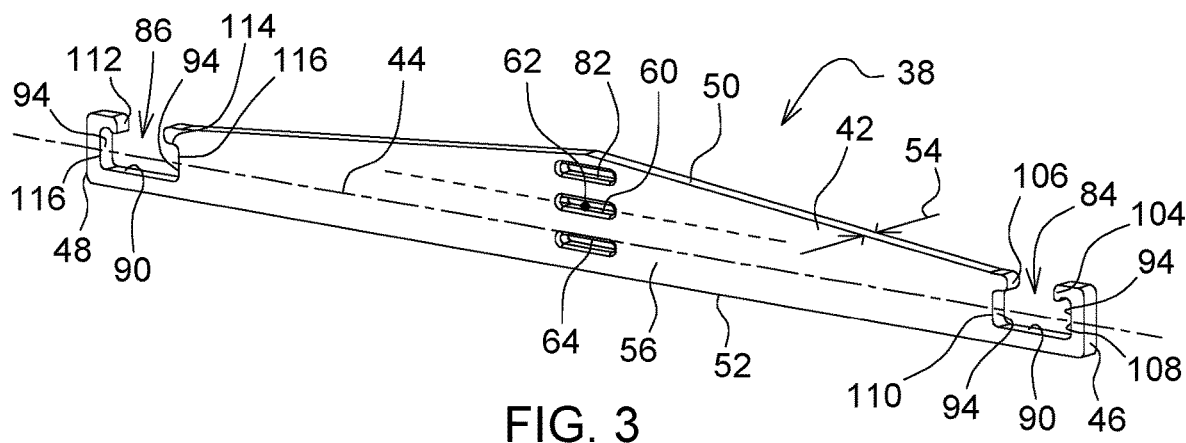
FIG. 3 is a schematic perspective view of a hanger of the lift system.

Referring to FIGS. 1 and 2, the baler implement 20 includes an implement body 22. The implement body 22 may include one or more panels that form an exterior surface of the baler implement 20, as well as the frame and other support members that support the panels and other components of the baler implement 20. The baler implement 20 includes a wrap system 24 that is attached to the implement body 22. The wrap system 24 includes a roll of wrap material 26 that is supported relative to the implement body 22 in an installed position 32.

The roll of wrap material 26 includes a width that is substantially equal to, or perhaps slightly larger than, a height (or length) of the round bale. The wrap material may include a film, mesh, net, or other material suitable for wrapping around a circumference of the round bale to secure the shape and/or form of the round bale, and/or to protect the round bale from moisture intrusion. For example, the wrap material may include, but is not limited to, a net or a plastic film that is wound around the circumference of the round bale.

The wrap system 24 is configured for wrapping the wrap material around the formed round bale in the bale forming chamber of the baler implement 20. As such, the wrap system 24 un-winds the wrap material from the roll of wrap material 26 and feeds the wrap material into the bale forming chamber, where the wrap material is wound around the circumference of the round bale. The specific manner in which the wrap system 24 un-winds the wrap material, feeds the wrap material into the bale forming chamber, and wraps the wrap material around the round bale within the bale forming chamber is not pertinent to the teachings of this disclosure, are known to those skilled in the art, and are therefore not described in detail herein.

Referring to FIGS. 1 and 2, a cover 28 is moveably attached to the implement body 22. The cover 28 is moveable between a closed position, shown in FIG. 1, and an open position, shown in FIG. 2. When the cover 28 is disposed in the open position, the cover 28 provides access to the wrap system 24 from an exterior location of the baler implement 20. The exterior location may include, for example, a location an operator may stand when loading the roll of wrap material 26 into the wrap system 24, or otherwise servicing the wrap system 24. When the cover 28 is disposed in the closed position, the cover 28 encloses the wrap system 24 from the exterior location. As such, when the cover 28 is in the closed position, the implement body 22 and the cover 28 cooperate to form a wrap chamber therebetween, wherein the roll of the wrap material is positioned when in the installed position 32. With the cover 28 in the closed position, the wrap chamber is generally closed or sealed to prevent or limit dust, dirt, debris, and moisture from contacting the wrap system 24, including the roll of wrap material 26.

The exemplary implementation of the baler implement 20 includes the cover 28 rotatable about a horizontal axis, such that the cover 28 moves in an upward and/or downward motion relative to the implement body 22, whereby the cover 28 is positioned vertically above the wrap system 24 when disposed in the open position. However, it should be appreciated that in other embodiments, the cover 28 may rotate about a vertical axis, such that the cover 28 moves in a side-to-side motion, whereby the cover 28 is positioned to a side of the baler implement 20 when positioned in the open position.

Referring to FIGS. 1 and 2, the baler implement 20 further includes a lift system 30. The lift system 30 is operable to raise the roll of wrap material 26, relative to the implement body 22, into the installed position 32. The lift system 30 is attached to one of the implement body 22 and the cover 28. When the cover 28 is disposed in the closed position, such as shown in FIG. 1, the lift system 30 is concealed between the implement body 22 and the cover 28, within the wrap chamber. The lift system 30 may be accessed by moving the cover 28 into the open position, such as shown in FIG. 2. In the exemplary embodiment shown in the Figures and described herein, when the cover 28 is disposed in the open position, the lift system 30 is positioned below the cover 28. However, as noted above, if the cover 28 moves to the side when opened, then the lift system 30 would not be positioned below the cover 28.

The lift system 30 includes a lift location, or a lift point. The lift location is the location from which a vertical force is applied to one or more components of the baler implement 20 in order to raise the roll of wrap material 26. When the cover 28 is disposed in the open position, the lift location is positionable at an elevation disposed above the installed position 32 of the roll of wrap material 26. The lift location is located vertically above the installed position 32 of the roll of wrap material 26 so that the roll may be fully lifted into the installed position 32.

Referring to FIG. 2, the lift system 30 may include a line actuator 34 having a lift line 36. The lift line 36 extends from the lift location downward for engagement with the roll of wrap material 26. The lift line 36 may include, but is not limited to, a cable, a rope, a chain, a strap, etc. The lift line 36 includes or is attached to a hanger 38 for engaging lifting bands 88 associated with the roll of wrap material 26.

The line actuator 34 may include a mechanism capable of retracting and extending the lift line 36 in order to raise and lower the roll of wrap material 26. For example, the line actuator 34 may include a winding device having a rotatable member that is rotatable about an axis, and that is capable of winding and un-winding the lift line 36 in order to raise and lower the roll of wrap material 26. For example, the line actuator 34 may include, but is not limited to, an electrically driven winch or a manually operated winch that winds and unwinds the lift line 36 to raise and lower the roll. It should be appreciated that the lift system 30 may include a device other than the exemplary embodiments of the line actuator 34 described herein for raising the roll of wrap material 26.

Figure 6:
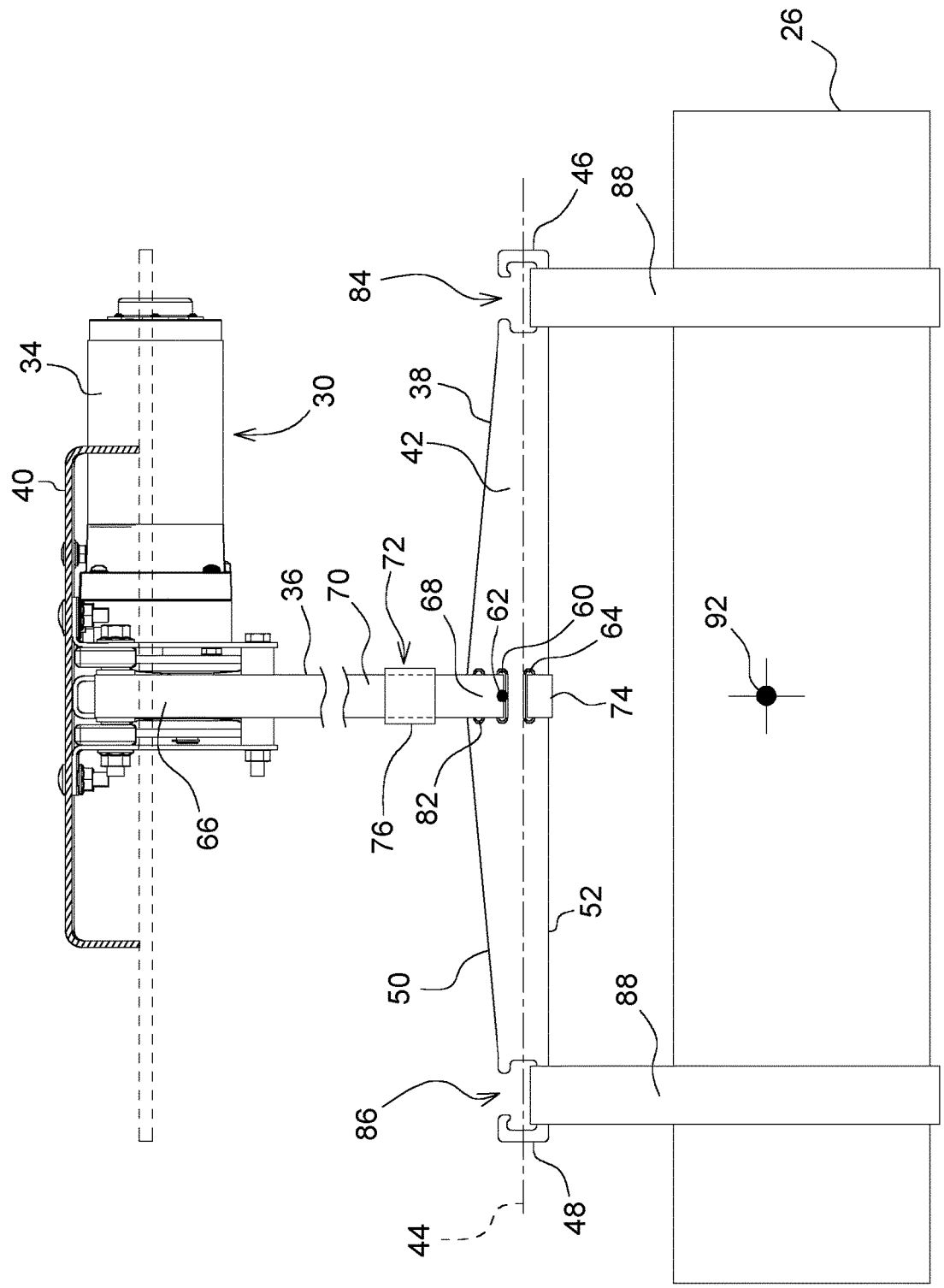
FIG. 6 is a schematic end view showing the lift system coupled to the roll of wrap material.

In some embodiments, the lift system 30 may include a lift structure 40. In one implementation, the lift structure 40 may be directly attached to the cover 28 to define the lift location, such as shown in FIGS. 2 and 6. In other embodiments, the lift structure 40 may be attached to other structural components of the implement body 22.

The example implementation of the lift system 30 includes the line actuator 34 directly attached to the lift structure 40, which is in turn attached to the cover 28. The line actuator 34 may be extended to lower the lift line 36 for attachment to the roll of wrap material 26 at a lower elevation. Once the lift line 36 is attached to the roll of wrap material 26, the line actuator 34 may be retracted, e.g., wound, to raise the roll of wrap material 26 into the installed position 32 in the wrap system 24.

Referring to FIGS. 3-6, the hanger 38 includes a hanger body 42. In the example implementation described herein, the hanger body 42 is a generally planar structure. The hanger body 42 extends along a central longitudinal axis 44 between a first longitudinal end 46 and a second longitudinal end 48. The hanger body 42 includes an upper edge 50 and a lower edge 52 both extending between the first longitudinal end 46 and the second longitudinal end 48. The first longitudinal end 46, the second longitudinal end 48, the upper edge 50, and the lower edge 52, all exhibit a thickness 54 of the hanger body 42. The hanger body 42 further includes a first planar side 56 and an opposing second planar side 58. The first planar side 56 and the second planar side 58 extend longitudinal along the central longitudinal axis 44 between the first longitudinal end 46 and the second longitudinal end 48. The first planar side 56 and the second planar side 58 also extend laterally between the upper edge 50 and the lower edge 52.

The hanger body 42 defines a first aperture 60. The first aperture 60 extends through the hanger body 42, between the first planar side 56 and the second planar side 58. The first aperture 60 is positioned such that a center of gravity 62 of the hanger body 42 is located within the first aperture 60.

The hanger body 42 further defines a second aperture 64. The second aperture 64 extends through the hanger body 42, between the first planar side 56 and the second planar side 58. The second aperture 64 is positioned vertically below the first aperture 60 and below the center of gravity 62 of the hanger body 42 when the hanger body 42 is arranged in an upright position. The upright position is defined as an orientation of the hanger body 42 in which the first planar side 56 and the second planar side 58 are vertical, with the upper edge 50 of the hanger body 42 disposed above the lower edge 52 of the hanger body 42. As such, the second aperture 64 is positioned vertically below the first aperture 60 when the hanger body 42 is arranged with the first planar side 56 and the second planar side 58 vertical and with the upper edge 50 vertically above the lower edge 52.

The lift line 36 has an upper end portion 66, a lower end portion 68, and a central portion 70. The upper end portion 66 is secured to the line actuator 34. In one implementation, the upper end portion 66 is secured to the rotatable member of the line actuator 34. The lift line 36 is retractable into the line actuator 34 in response to movement of the line actuator 34 in a first direction, e.g., rotation of the rotatable member in a first rotational direction. The lift line 36 is extendable out of the line actuator 34 in response to movement of the line actuator 34 in a second direction, e.g., rotation of the rotatable member in a second rotational direction.

The lower end portion 68 of the lift line 36 is attached to and/or supports the hanger 38. The lower end portion 68 of the lift line 36 passes through the first aperture 60 such that the lift line 36 applies a lift force to the hanger body 42 at the first aperture 60, i.e., at the center of gravity 62 of the hanger body 42.

The central portion 70 of the lift line 36 is disposed between the upper end portion 66 and the lower end portion 68 of the lift line 36. The lift line 36 may further include a connection 72 securing the lower end portion 68 to the central portion 70, thereby forming a loop portion 74 of the lift line 36. The hanger 38 may be supported by the loop portion 74 of the lift line 36.

The connection 72 between the lower end portion 68 and the central portion 70 of the lift line 36 may include, but is not limited to, one of a sewn connection 72 or a mechanical fastener 76. If the connection 72 is made via a mechanical fastener 76, the connection 72 may include, but is not limited to, a tri-glide fastener, a D-ring, buckle, cam lock, or some other type of fastener capable of securing strap or cable.

The lift line 36 may include, but is not limited to, a generally rectangular cross-sectional shape, or a generally circular cross-sectional shape. The first aperture 60 and the second aperture 64 are sized and shaped to correspond to the cross-sectional shape of the lift line 36. In the example implementation shown in the Figures, the lift line 36 is implemented as a substantially flat strap, such as but not limited to flexible nylon strap, having a generally rectangular cross-sectional shape. The first aperture 60 and the second aperture 64 are shaped to correspond with the generally rectangular cross-sectional shape of the strap. As such, the first aperture 60 and the second aperture 64 are each implemented as elongated slots having a shape and size to match the generally rectangular cross-sectional shape of the lift line 36, and having a long axis 78 extending parallel with the central longitudinal axis 44 and/or the long dimension of the hanger body 42.

Figure 5:
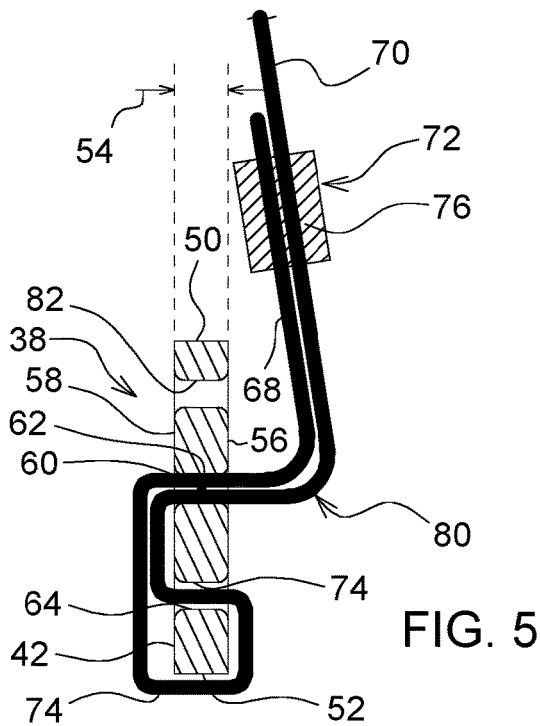
FIG. 5 is schematic cross-sectional view of the hanger showing a lift line lashing path.

As described above, the lower end portion 68 of the lift line 36 may be secured to the central portion 70 of the lift line 36 to form the loop portion 74 of the lift line 36. In the example implementation described herein, the loop portion 74 of the lift line 36 passes through the first aperture 60. As shown in FIG. 5, the lift line 36 follows a lashing path 80 to secure the hanger 38 to the lift line 36. In one implementation, following in sequence from the central portion 70 of the lift line 36 toward the lower end portion 68 of the lift line 36, the lashing path 80 passes the lift line 36 from the first planar side 56 to the second planar side 58 through the first aperture 60, positions the lift line 36 adjacent the second planar side 58 between the first aperture 60 and the second aperture 64, passes the lift line 36 from the second planar side 58 to the first planar side 56 through the second aperture 64, positions the lift line 36 adjacent the first planar side 56 between the second aperture 64 and the lower edge 52 of the hanger body 42, wraps the lift line 36 from the first planar side 56 around the lower edge 52 of the hanger body 42 to the second planar side 58, positions the lift line 36 adjacent the second planar side 58 between the lower edge 52 of the hanger body 42 and the first aperture 60, and passes the lift line 36 from the second planar side 58 to the first planar side 56 through the first aperture 60, whereby the lower end portion 68 of the lift line 36 may be attached to the central portion 70 of the lift line 36 on the first planar side 56 of the hanger body 42.

Figure 7:
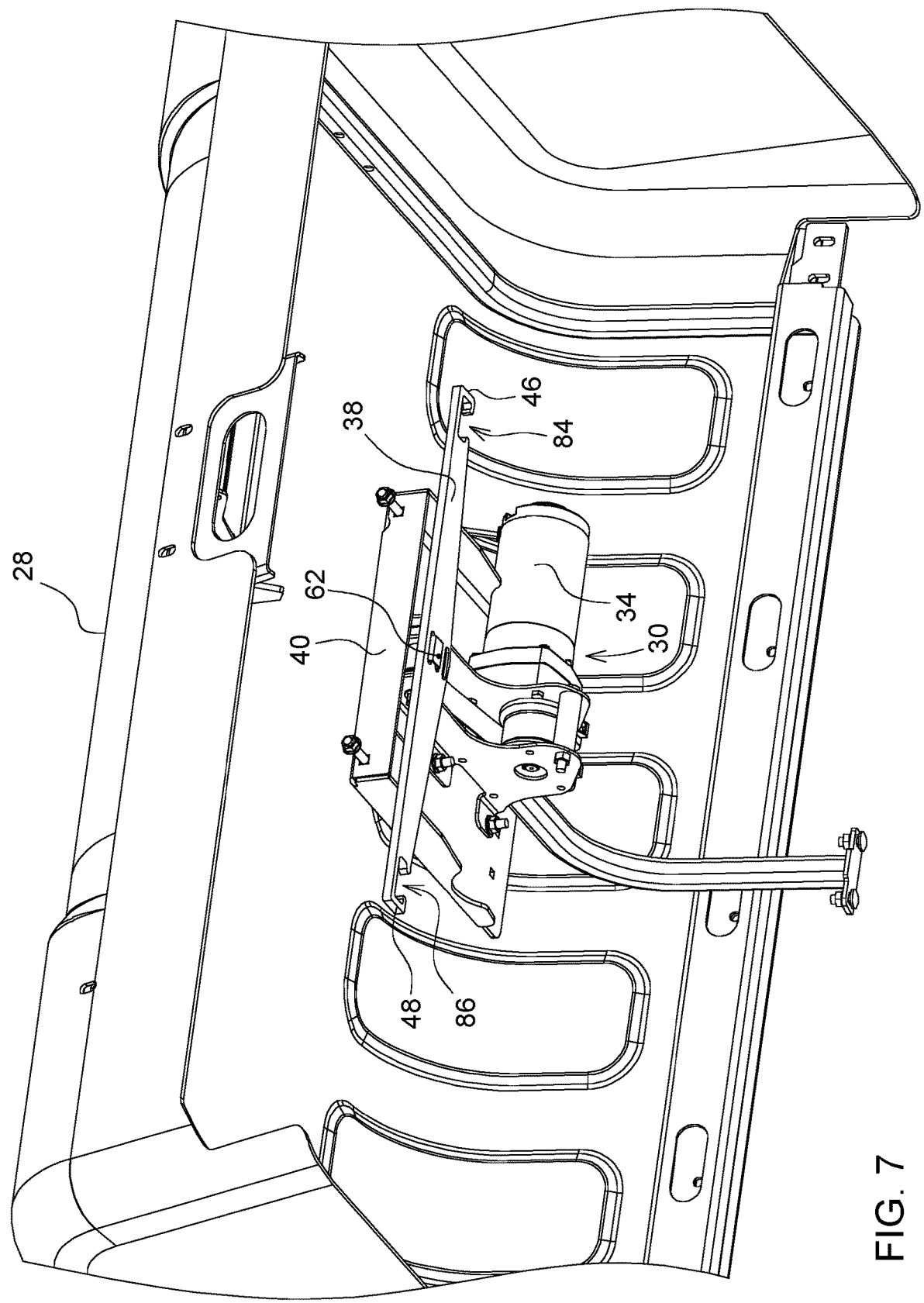
FIG. 7 is a schematic perspective view of the lift system showing the hanger in a stored position.

Following the lashing path 80 described above, the lift line 36 applies the lifting force to the hanger body 42 at the first aperture 60, i.e., the center of gravity 62 of the hanger body 42, from the first planar side 56 of the hanger body 42. This configuration enables the hanger 38 to be drawn up snugly against the lift structure 40 and held with the first planar side 56 of the hanger body 42 resting flat against the lift structure 40 when the lift line 36 is retracted into the line actuator 34, such as shown in FIG. 7 and in phantom in FIG. 6. Accordingly, the hanger 38 may be conveniently stored tight against the lift structure 40 when not in use, and held in place via tension in the lift line 36 applied via the line actuator 34. It should be appreciated that the lashing path 80 described above may be reversed to position the second planar side 58 of the hanger 38 against the lift structure 40.

The hanger body 42 may further define a third aperture 82. The third aperture 82 extends through the hanger body 42 between the first planar side 56 and the second planar side 58. The third aperture 82 is positioned vertically above the center of gravity 62 when the hanger body 42 is arranged in an upright position. The third aperture 82 permits the lift line 36 to be routed using an alternative configuration if desired.

Figure 4:
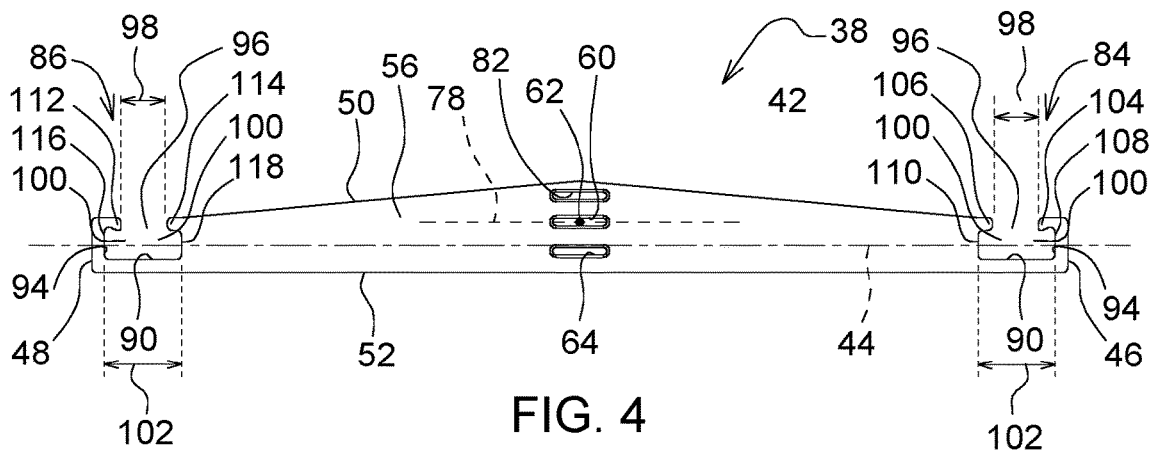
FIG. 4 is a schematic front plan view of the hanger.

Referring to FIGS. 4 and 6, the upper edge 50 of the hanger body 42 defines a first pocket 84 disposed proximate the first longitudinal end 46 of the hanger body 42, and a second pocket 86 disposed proximate the second longitudinal end 48 of the hanger body 42. The first pocket 84 and the second pocket 86 are spaced equidistant from the center of gravity 62 of the hanger body 42, along the central longitudinal axis 44 of the hanger body 42. Each of the first pocket 84 and the second pocket 86 are shaped to receive a respective lifting band 88 of the roll of wrap material 26 therein for raising the roll of the wrap material.

In one aspect of the disclosure, the first pocket 84 and the second pocket 86 may each include a respective engagement surface 90 that is positioned vertically below the first aperture 60 when the hanger body 42 is arranged in the upright position, with the upper edge 50 positioned vertically above the lower edge 52. When lifting the roll of wrap material 26, the combined center of gravity 92 of the hanger 38 and the roll of wrap material 26 is below the first aperture 60. This configuration, in which the engagement surface 90s are positioned below the first aperture 60, causes the hanger 38 to rotate into the upright position while raising the roll of the wrap material. When the roll is removed, the center of gravity 62 of the hanger 38 aligns with the first aperture 60, thereby enabling the hanger 38 to lay flat such that the hanger 38 may be positioned flat against the lift structure 40 when raised into the storage position.

The first pocket 84 may be shaped to include pocket sides 94 extending vertically when the hanger 38 is arranged in the upright position to capture its respective lifting band 88 of the roll of wrap material 26 therebetween, such that the lifting band 88 is restricted against lateral movement off the first longitudinal end 46 of the hanger 38. Similarly, the second pocket 86 may be shaped to include pocket sides 94 extending vertically when the hanger 38 is arranged in the upright position to capture a respective lifting band 88 of the roll of wrap material 26 therebetween, such that the lifting band 88 is restricted against lateral movement off the second longitudinal end 48 of the hanger 38.

In one aspect of the disclosure, each of the first pocket 84 and the second pocket 86 includes an opening 96 defining an opening width 98 along the upper edge 50 of the hanger 38. Each of the first pocket 84 and the second pocket 86 include an interior 100 for securing the respective lifting band 88 therein. The interior 100 of each of the first pocket 84 and the second pocket 86 defines an interior width 102 along the upper edge 50 of the hanger 38. The opening width 98 may be less than the interior width 102 to restrict the lifting bands 88 from dislodging from the interior 100 of the first pocket 84 and the second pocket 86 respectively.

In one aspect of the disclosure, the first pocket 84 may include a respective outer lip 104 partially covering an outer edge 108 of the first pocket 84, and a respective inner lip 106 partially covering an inner edge 110 of the first pocket 84. The inner lip 106 and the outer lip 104 of the first pocket 84 operate to capture the respective lifting band 88 therein to prevent the lifting band 88 from dislodging from the first pocket 84. Similarly, the second pocket 86 may include a respective outer lip 112 partially covering an outer edge 116 of the second pocket 86 and a respective inner lip 114 partially covering an inner edge 118 of the second pocket 86. The inner lip 114 and the outer lip 112 of the second pocket 86 operate to capture the respective lifting band 88 therein to prevent the lifting band 88 from dislodging from the second pocket 86.

The exemplary implementation of the baler implement 20 shown in the Figures and described herein shows the wrap system 24 and the lift system 30 located at the rearward end of the baler implement 20. However, it should be appreciated that the teachings of this disclosure may be applied to implementations of the baler implement 20 in which the wrap system 24, the lift system 30 and the cover 28 are located at the forward end of the baler implement 20.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A lift system for loading a roll of wrap material into a wrap system of a baler implement, the lift system comprising:
   a line actuator configured for attachment to a structure of the baler implement;
   a hanger including a hanger body having a first planar side and an opposing second planar side, wherein the hanger body defines a first aperture extending through the hanger body between the first planar side and the second planar side, with the first aperture positioned such that a center of gravity of the hanger body is located within the first aperture;
   a lift line having an upper end portion secured to the line actuator, wherein the lift line is retractable into the line actuator in response to movement of the line actuator in a first direction, and wherein the lift line is extendable out of the line actuator in response to movement of the line actuator in a second direction;
   wherein the lift line includes a lower end portion supporting the hanger, with the lower end portion of the lift line passing through the first aperture such that the lift line applies a lift force to the hanger body at the center of gravity of the hanger body.

2. The lift system set forth in claim 1, wherein the lift line includes a central portion disposed between the upper end portion and the lower end portion of the lift line, and further comprising a connection securing the lower end portion to the central portion thereby forming a loop portion of the lift line supporting the hanger.

3. The lift system set forth in claim 2, wherein the connection includes one of a sewn connection or a mechanical fastener.

4. The lift system set forth in claim 2, wherein the connection includes a tri-glide fastener.

5. The lift system set forth in claim 2, wherein the loop portion of the lift line passes through the first aperture.

6. The lift system set forth in claim 2, wherein the hanger body defines a second aperture extending through the hanger body between the first planar side and the second planar side, with the second aperture positioned vertically below the center of gravity when the hanger body is arranged in an upright position.

7. The lift system set forth in claim 6, wherein the hanger body includes an upper edge and an opposing lower edge, and wherein the second aperture is positioned vertically below the first aperture when the hanger body is arranged with the first planar side and the second planar side vertical and with the upper edge vertically above the lower edge.

8. The lift system set forth in claim 6, wherein the lift line follows a lashing path to secure the hanger to the lift line, wherein the lashing path passes the lift line from the first planar side to the second planar side through the first aperture, positions the lift line adjacent the second planar side between the first aperture and the second aperture, passes the lift line from the second planar side to the first planar side through the second aperture, positions the lift line adjacent the first planar side between the second aperture and the lower edge of the hanger body, wraps the lift line from the first planar side around the lower edge of the hanger body to the second planar side, positions the lift line adjacent the second planar side between the lower edge of the hanger body and the first aperture, and passes the lift line from the second planar side to the first planar side through the first aperture.

9. The lift system set forth in claim 1, wherein the lift line includes a substantially flat strap.

10. The lift system set forth in claim 9, wherein the first aperture includes an elongated slot having a long axis extending parallel with a long dimension of the hanger.

11. The lift system set forth in claim 1, wherein the hanger body includes an upper edge and an opposing lower edge each extending between a first longitudinal end and a second longitudinal end of the hanger body, wherein the upper edge of the hanger body defines a first pocket disposed proximate the first longitudinal end of the hanger body, and wherein the upper edge of the hanger body defines a second pocket disposed proximate the second longitudinal end of the hanger body.

12. The lift system set forth in claim 11, wherein each of the first pocket and the second pocket are shaped to receive a respective lifting band of the roll of wrap material therein.

13. The lift system set forth in claim 11, wherein the first pocket is shaped to include sides extending vertically when the hanger is arranged in an upright position to capture a first respective lifting band of the roll of wrap material therebetween, such that the first respective lifting band is restricted against lateral movement off the first longitudinal end of the hanger, and wherein the second pocket is shaped to include sides extending vertically when the hanger is arranged in the upright position to capture a second respective lifting band of the roll of wrap material therebetween, such that the second respective lifting band is restricted against lateral movement off the second longitudinal end of the hanger.

14. The lift system set forth in claim 11, wherein each of the first pocket and the second pocket includes an opening defining an opening width along the upper edge of the hanger, and wherein each of the first pocket and the second pocket include an interior for securing a respective lifting band therein, wherein the interior of each of the first pocket and the second pocket defines an interior width along the upper edge of the hanger, with the opening width less than the interior width.

15. The lift system set forth in claim 11, wherein the first pocket includes a respective outer lip partially covering an outer edge of the first pocket and a respective inner lip partially covering an inner edge of the first pocket, and wherein the second pocket includes a respective outer lip partially covering an outer edge of the second pocket and a respective inner lip partially covering an inner edge of the second pocket.

16. The lift system set forth in claim 11, wherein the first pocket and the second pocket are spaced equidistant from the center of gravity of the hanger body.

17. The lift system set forth in claim 11, wherein the first pocket and the second pocket each include a respective engagement surface positioned vertically below the first aperture when the hanger body is arranged in an upright position with the upper edge positioned vertically above the lower edge.

18. A hanger for a net wrap lift system of a baler implement, the hanger comprising:
   a hanger body having an upper edge and an opposing lower edge, with a first planar side and an opposing second planar side extending between the upper edge and the lower edge;
   wherein the hanger body defines a first aperture extending through the hanger body between the first planar side and the second planar side, with the first aperture positioned such that a center of gravity of the hanger body is located within the first aperture; and
   wherein the hanger body defines a second aperture extending through the hanger body between the first planar side and the second planar side, with the second aperture positioned vertically below the first aperture when the hanger body is arranged in an upright position with the upper edge of the hanger body positioned vertically above the lower edge of the hanger body.

19. The hanger set forth in claim 18, wherein the upper edge and the opposing lower edge of the hanger body each extend between a first longitudinal end and a second longitudinal end of the hanger body, wherein the upper edge of the hanger body defines a first pocket disposed proximate the first longitudinal end of the hanger body, and wherein the upper edge of the hanger body defines a second pocket disposed proximate the second longitudinal end of the hanger body.

20. The hanger set forth in claim 19, wherein the first pocket is shaped to include sides extending vertically when the hanger is arranged in an upright position to capture a first respective lifting band of the roll of wrap material therebetween, such that the first respective lifting band is restricted against lateral movement off the first longitudinal end of the hanger, and wherein the second pocket is shaped to include sides extending vertically when the hanger is arranged in an upright position to capture a second respective lifting band of the roll of wrap material therebetween, such that the second respective lifting band is restricted against lateral movement off the second longitudinal end of the hanger.

21. The hanger set forth in claim 19, wherein each of the first pocket and the second pocket includes an opening defining an opening width along the upper edge of the hanger, and wherein each of the first pocket and the second pocket include an interior for securing a respective lifting band therein, wherein the interior of each of the first pocket and the second pocket defines an interior width along the upper edge of the hanger, with the opening width less than the interior width.

22. The hanger set forth in claim 19, wherein the first pocket includes a respective outer lip partially covering an outer edge of the first pocket and a respective inner lip partially covering an inner edge of the first pocket, and wherein the second pocket includes a respective outer lip partially covering an outer edge of the second pocket and a respective inner lip partially covering an inner edge of the second pocket.

23. The hanger set forth in claim 19, wherein the first pocket and the second pocket are spaced equidistant from the center of gravity of the hanger body.

24. The hanger set forth in claim 19, wherein the first pocket and the second pocket each include a respective engagement surface positioned vertically below the first aperture when the hanger body is arranged in an upright position with the upper edge positioned vertically above the lower edge.

* * * * *